M. J. HUGGINS.
SPEED CONTROLLING MECHANISM FOR AUTOMOBILES.
APPLICATION FILED MAR. 13, 1916.

1,207,760.

Patented Dec. 12, 1916.
2 SHEETS—SHEET 1.

Inventor
Marion J. Huggins,
By his Attorney
Benjamin Roman.

M. J. HUGGINS.
SPEED CONTROLLING MECHANISM FOR AUTOMOBILES.
APPLICATION FILED MAR. 13, 1916.

1,207,760.

Patented Dec. 12, 1916.
2 SHEETS—SHEET 2.

Inventor
Marion J. Huggins.
By his Attorney
Benjamin Roman

UNITED STATES PATENT OFFICE.

MERION J. HUGGINS, OF NEW YORK, N. Y.

SPEED-CONTROLLING MECHANISM FOR AUTOMOBILES.

1,207,760.         Specification of Letters Patent.         Patented Dec. 12, 1916.

Application filed March 13, 1916. Serial No. 83,841.

*To all whom it may concern:*

Be it known that I, MERION J. HUGGINS, a citizen of the United States, and resident of the city of New York, in the county of Kings and State of New York, have invented certain new and useful Improvements in Speed-Controlling Mechanism for Automobiles, of which the following is a specification.

This invention relates to automobiles, particularly to the speed controlling mechanism thereof, and its principal object is to provide simple, efficient, reliable, and improved means for controlling the speed of the automobile, and for driving the automobile wheels at a variable speed relatively to the speed of the engine or prime mover.

Another object is to provide improved, conveniently operated, and readily responsive means for controlling the changing of the speeds and reversing of the wheels.

Other objects and advantages will hereinafter appear.

Figure 1:
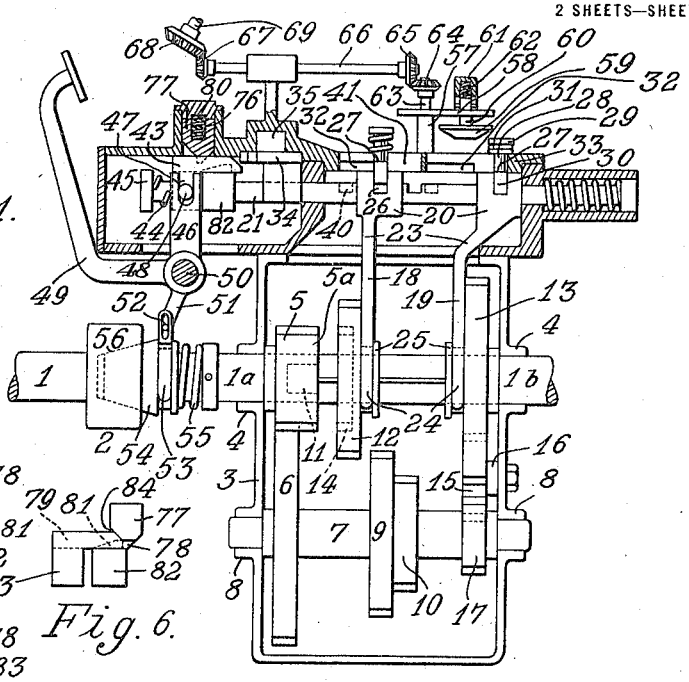
Figures 2, 5, 6, 7:
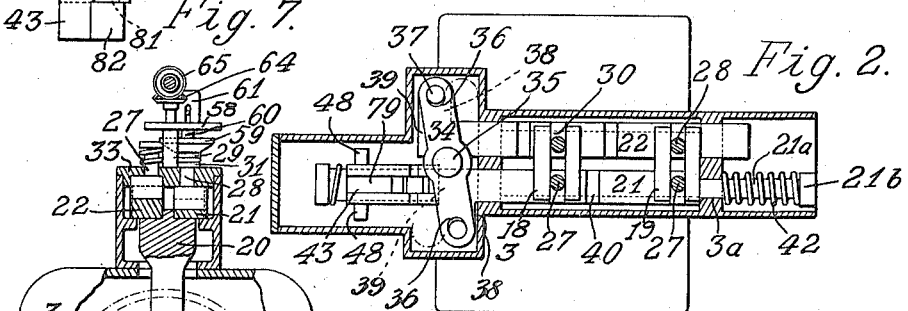
Figure 4:
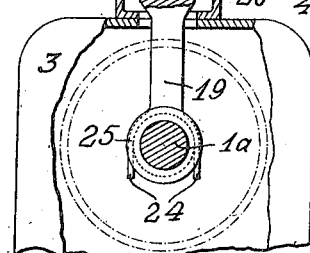
Figures 3, 8:
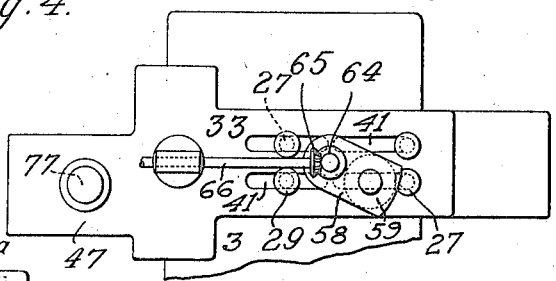
Figure 11:
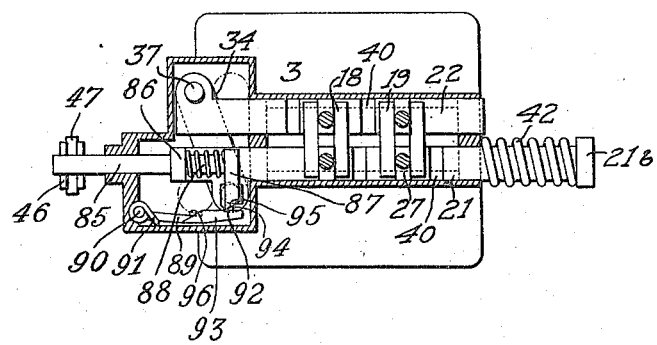
Figure 9:
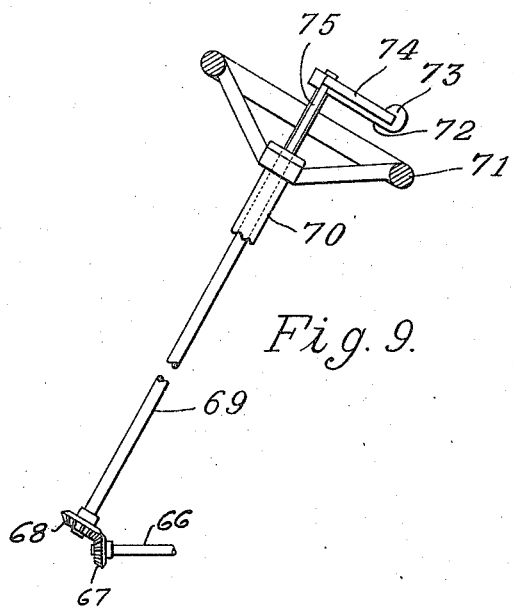
Figure 10:
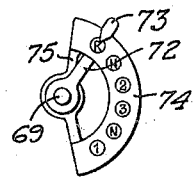

In the accompanying drawings,—Figure 1 is a general view, partly in section and partly in full, showing an elevation of an automobile gear transmission, to which the invention is here shown as adapted, with the operating mechanism therefor. Fig. 2 is a sectional plan view of the mechanism shown in Fig. 1. Fig. 3 is a general plan view of the mechanism shown in Fig. 1. Fig. 4 is a sectional end elevation of the mechanism shown in Figs. 1, 2, and 3. Figs. 5, 6, and 7 are detail views illustrating the operation of parts of the mechanism. Figs. 8, 9, and 10 are details of said mechanism. Fig. 11 is a sectional plan view showing a modification of the invention.

A shaft 1, driven by the automobile engine, not shown, drives a section $1^a$ thereof, which is split therefrom at clutch 2, Fig. 1, and extends to the gear-casing 3, where it is mounted in bearings 4 of said casing. The shaft-section $1^a$ carries a wide gear 5 which drives a gear 6 that is keyed upon and drives a counter-shaft 7 mounted in bearings 8 of said casing. Said counter-shaft carries drive gears 9 and 10 of different sizes, and the rear shaft-section $1^b$ of the drive shaft, split from shaft-section $1^a$ at 11 and running independently thereof, carries coöperating transmission gears 12 and 13 splined to shift thereupon so that any one of said transmission gears may be caused to mesh with and unmesh from its coöperating drive gear on said counter-shaft, and various speeds may be thereby transmitted to the shaft $1^b$, which in turn drives the wheels of the automobile, not shown, at various speeds. Thus when the gears 12, 13 are unmeshed, the counter-shaft 7 driven by gears 5, 6 from shaft-section $1^a$ runs idly and no motion is transmitted to the shaft-section $1^b$, and when the gears 13, 10 are meshed a slow speed is imparted to the shaft-section $1^b$. Likewise, when the gears 12, 9 are meshed a higher speed is transmitted to the shaft $1^b$, and when the gear 12 having an internal gear 14 is shifted to mesh the internal gear with the portion $5^a$ of wire gear 5 the shaft-section $1^b$ is driven at highest speed, directly from shaft-section $1^a$. In order to rotate the shaft $1^b$ oppositely for reversing the automobile wheels, the gear 13 is meshed with an intermediate idler-gear 15, which is mounted on a stud 16 fixed to casing 3 and is driven by a drive gear 17 carried upon the counter-shaft 7. The gears are meshed and unmeshed by means of shifting devices 18, 19 which comprise hubs 20 carried upon rods 21, 22 mounted in guiding ways $3^a$ of casing 3, arms 23 extending from said hubs, and forked portions 24 at the extremities of said arms that embrace shouldered collars 25 of the shiftable gears.

Within a notch 26 in the hub 20 of each shifting device is carried a pair of locking latches 27, each of which consists of a pin 28 having a flange 29 and a flattened portion 30 the lower part of which is located within the notch 26. And normally a spring 31 surrounding each of said pins presses against its flange 29 and lodges the upper part of its portion 30 within a receiving recess 32 formed in a plate 33 secured to the casing 3, whereby the shifting device is firmly maintained locked and shifting thereof is prevented while the gear carried thereby is maintained locked in unmeshed state.

The latch 27 opposite rod 21 bears against edge $32^a$ of its recess 32 to prevent movement of its shifting device and gear carried thereby toward the right, and the adjacent latch of the same device bears against the edge $32^a$ of its recess 32 to prevent movement of the gear toward the left. The rods 21, 22 are parallel to each other and each is shiftable longitudinally toward the left and toward the right, as viewed in the drawing, through the guiding ways 3ª and through the hubs 20 of the shifting devices 18, 19. A link-plate 34, having a centrally located stud 35 which is pivotally mounted in the plate 33, is provided at its ends with elongated openings 36 which fit over pins 37 projecting upwardly from wings 38 which extend rightangularly from the extremities 39 of the rods 21, 22. Upon drawing the rod 21 toward the left and then moving it backwardly toward the right, it swings or oscillates the connecting link 34 about its pivot, and through the link imparts simultaneously an opposite stroke to the rod 22, first forwardly toward the right and then backwardly toward the left to initial position. The rods 21, 22 are rectangular in cross-section and are provided with transverse notches 40 which register with the latches 27 when said rods are at the termination of the forward portion of their simultaneous stroke, whereby upon pressing down any one of the latches 27, contrary to spring 31, toward the rod opposite thereto, just before said rods are shifted or just before they have completed the forward portion of their stroke, the upper part of its flat portion 30 is caused to leave its recess 32 in plate 33 and the lower part of this portion is compelled to enter its registering notch 40 in the rod, in which manner the particular shifting device carrying said notch is unlocked from the plate 33 and locked firmly to the rod 21 or to the rod 22, depending upon which of the two latches 27 of the particular shifting device has been thus pressed. And hence, upon the backward portion of the simultaneous stroke of the rods 21, 22 said locked shifting device is carried along and shifted toward the right, as viewed in the drawing, if its latch 27 which is opposite the rod 21 has been previously pressed, but if its other latch 27 has been pressed and the shifting device thus locked to the rod 22 it is carried along by this rod in an opposite direction and shifted from neutral position toward the left, whereby the gear carried by this shifting device can be shifted in opposite directions from a neutral position and meshed with either of its coöperating drive gears. Conversely, during the forward portion of a subsequent stroke of the rods 21, 22 the shifting device previously locked thereto is shifted back, toward the left or toward the right, depending upon whether the shifting device has been locked to the rod 21 or to the rod 22, and the spring 31 of the latch which was maintaining said device locked to the rod causes the latch-portion 30 to clear its notch 40 of the rod and to reënter its recess 32 in plate 33, in which manner the shifting device is restored to initial or locked neutral position and the gear carried thereby is unmeshed. Upon the backward portion of the same subsequent simultaneous stroke of the rods 21, 22 they either return idly or together with the other shifting device or with the same shifting device, according to whichever of said devices has been locked to one or the other of said rods.

During the movement of the shifting device both of its latches 27 are carried along therewith and the lower part of the flat portion 30 of that latch which has been pressed is maintained within its notch 40 of the rod by the plate 33 bearing upon the upper face of said flat portion 30, the pin 28 of said latch being meanwhile retained within an elongated slot 41 in plate 33, Figs. 1 and 8, and the other latch being meanwhile permitted to travel along idly with the moving shifting-device by having its pin 28 retained within a similar slot 41 and the upper part of its flat portion 30 traveling within its recess 32, which is made elongated as shown, to provide clearance therefor while it is traveling idly.

The drawing of the rod 21 toward the left, during the forward portion of its stroke, simultaneously compresses a spring 42, which is located at the end of the rod near guiding way 3ª, surrounds the rod-end 21ª, and is adapted to press against a head 21ᵇ of said rod-end and against the end of said guiding way. Upon releasing of the rod 21 after having been drawn fully toward the left, it permits the spring 42, which has been thus previously compressed, to shift the rod 21 back toward the right and consequently, through the link 34, the rod 22 back toward the left. The rod 21 is actuated by means of drawing a block 43 splined thereupon, which when being drawn bears against and compresses an intervening spring 44 that in turn abuts against a head 45 at the extremity of the rod. An arm 46 having a slotted end 47 in slidable engagement with pins 48 projecting from the block 43 is connected to the hub of a pedal 49, which is thus fulcrumed with said arm at a common pivot 50 and is utilized for operating the drive-shaft clutch 2. Upon pressing of the foot-pedal 49 to swing it toward the left and releasing it to permit its return swinging toward the right, in the operation of the clutch, the block 43 is thereby shifted in opposite directions to draw the rod 21, to release it in the manner hereinafter seen, and, in conjunction with the action of spring 42 and link 34, to move the rods 21, 22 to perform their simultaneous forward and backward stroke in the above described manner. Said pedal is connected to the clutch 2 by means of an arm 51 thereof which is slidably joined to a slotted extension 52 of a forked arm 53 that embraces the cone-portion 54 of the clutch. Pressing of the pedal 49 moves the cone-portion 54 toward the right contrary to the pressure of clutch-spring 55 and disengages it from its coöperating clutch member 56 to unclutch the shaft-portions 1, 1ª. Releasing of the pedal causes the spring 55 to engage the cone-portion 54 with the member 56 to clutch the shaft-portions 1, 1ª, and to simultaneously swing the pedal back toward the right to its normal position shown in the drawing.

Midway between the latches 27 is located a post 57 which is secured to the plate 33 and carries thereupon a pivotally mounted arm 58. A presser-cam 59 is provided at the end of arm 58 and is held thereto by means of a shank 60 thereof which is splined in a guiding-bearing 61 of said arm, and a spring 62 located within bearing 61 continually bears against said shank and presses the cam 59 in a direction toward the plate 33. The arm 58 being revoluble about the axis of post 57 the presser-cam 59 carried thereby may be therewith brought upon and alined with any one of the latches 27. Upon bringing the cam 59 into alinement with any one of the latches 27 it presses forcibly and resiliently against such latch and operates it to enter its rod-notch 40 and lock its shifting device to the shifting rod opposite such latch. A stem 63 rotatable with the arm 58 carries a gear 64 that meshes with a gear 65 fixed upon a shaft 66, and said shaft carries a gear 67 that meshes with a gear 68 keyed upon a rod 69 which extends through and outwardly from the steering column 70 of the machine. The rod 69 is provided at its extremity above the steering wheel 71 with a lever 72 wherewith it may be rocked to rotate the gears 64, 65, 67, 68 and impart rotation to the arm 58 to thereby aline the presser-cam 59 for depressing any one of the latches 34. A pointer 73 extends from the extremity of lever 72 and around the outer side of a segmental frame 74, which is concentric with the rod 69 and is secured to the column 70 by means of brackets 75. Upon the frame 74 are marked speed indications, such as "reverse" or "R" "neutral" or "N," "1st," "2nd," and "direct" or "3rd," and the lever 72 with its pointer 73 may be swung to point to any one of said indications.

In the operation of the gear transmission the lever 72 may be set to point to any one of the indications upon indicator-frame 74, according to whichever coöperating pair of gears it is desired to mesh in the selection of speeds for the automobile wheels, and we will assume that said lever has been set to point to "R" or "reverse", as shown. The arm 58 is thereby rotated to set the cam 59 over the locking-latch 27 that belongs to the shifting device 19 and is located opposite to the rod 21, and the cam 59 is thereupon caused to bear resiliently against this latch, due to the pressure of cam-spring 62, and to press said latch against said rod. Lever 72 having been set to the desired speed indication the remaining step in the operation of selecting a particular speed is to press and release the foot-pedal 49. Upon pressing of the foot-pedal the drive-shaft portions 1, 1ª are unclutched, and during the unclutching operation the block 43 first moves idly, Fig. 5, to permit actual disengagement of clutch-members 54, 56, and incidentally compresses the spring 44; and then the rods 21, 22 are moved to perform the forward portions of their strokes, the rod 21 moving toward the left contrary to the pressure of spring 42, the link 34 being oscillated, and the rod 22 moving simultaneously toward the right. This movement of said rods alines their notches 40 with the locking latches 27 and carries back therewith any shifting device 18 or 19 that may have been locked thereto, and unmeshes or neutralizes the gear connected to such device and locks the device with its gear firmly in neutralized state to the fixed plate 33. A detent 76 is mounted in a guiding-bearing 77 to slide toward and away from the block 43 and is provided with a tooth 78 which is located within a groove 79 formed in the block. Said detent is pressed upon by a spring 80 which compels it to normally bear against the block 43 at each side of its groove 79. At the termination of the said movement of the rods 21, 22, and of the movement of the block 43, the detent 76 becomes released by the withdrawal of said block and its tooth 78 is caused to drop into the path of a stopping projection 81 of a collar 82 which is secured to the rod 21, whereupon the tooth 78 engages said projection, Fig. 6, and locks the rods 21, 22 in shifted position with the spring 42 in compressed state. At this moment the presser-cam 59, having been just previously set to press the latch 27 of shifting device 19, causes said latch, due to the action of cam-spring 62, to enter into its registering notch 40 and to lock the shifting device 19 to the rod 21. Upon the immediate releasing of the pedal 49 the shaft-portions 1, 1ª are clutched, and during the first part of the clutching operation and of the releasing movement of the pedal the block 43 moves backwardly toward the right and away from the rod-head 45, and first releases spring 44 without effecting the rod 21. During the interval of this initial part of the movement of block 43 a beveled cam-portion 83 thereof engages a cam-portion 84 of detent 76 and thereby shifts said detent in a direction away from the rod 21 and forces its tooth 78 out of the path of the locking projection 81, Fig. 7, whereby the detent and said projection become disengaged and the rods 21, 22 with the compressed spring 42 are thus released. Said spring thereupon immediately actuates the rods 21, 22 and imparting a snap movement thereto moves them to simultaneously perform the backward portions of their strokes, that of the rod 21 toward the right and the rod 22 toward the left, whereupon the rod 21 carries therewith the shifting device 19 locked thereto and shifts it with its gear 13 toward the right and meshes the gears 13, 15. The actual meshing of the gears, therefore, is performed solely by the action of spring 42, which upon being released is permitted to impart the snap movement to the rods 21, 22 without any coaction of their actuating block 43 and independent of the releasing movement or control of the pedal 49 or the operation of the clutch 2.

In shifting of the gears the spring 42 is first caused to be compressed during the pressing of the pedal 49 and the unclutching operation, during the releasing of the pedal and the first part of the clutching operation the spring 42 is maintained locked in compressed state and the actuating block 43 is moved back idly to clear the rod head 45, and during the termination of the clutching operation said spring is unlocked and permitted to impart the snap movement to the rods 21, 22, which thus shift the selected gear without control to mesh it with its coöperating gear. In addition to the mentioned functions of springs 42 it also serves to positively maintain the shifted gear in place and prevents accidental unmeshing thereof. It will be evident that the entire above described operation, of selecting and shifting the gears, is momentarily performed, requiring on the part of the operator merely the setting of the lever 72 and pressing of the pedal 49.

Should it be desired to unmesh the gears 13, 15, and to mesh any other coöperating pair of gears such as the gears 13, 10 for low speed, the lever 72 is set to point at "1", corresponding to such selection of speed, and it thereby sets the arm 58 to aline its presser-cam 59 with the latch 27 opposite the rod 22 in shifting device 19. Then the pedal 49 is pressed and released, whereupon the rods 21, 22 are actuated and the rod 21 moves the shifting device 19 and the gear 13 back, and thereby unmeshes the gears 13, 15 and locks the said shifting device with the gear 13 to the plate 33 in unmeshed or neutral position. The shifting device 19 is at this moment locked to the rod 22, and then the spring 42 moves the rods 21, 22 and causes the rod 22 to shift the device 19 with the gear 13 from neutral position toward the left and meshes the gears 13, 10.

It will be seen by following the mechanism in the drawing, that in a similar manner setting of the lever 72 to point at "2nd" or intermediate speed and pressing of the pedal 49 will first unmesh and neutralize any coöperating pair of gears that may be meshed, the presser cam 59 will actuate the latch 27 opposite the rod 21 in shifting device 18 and will lock said device to the rod 21, and said rod will then move and mesh the gears 12, 9. Likewise setting of the lever 72 to point at "3rd" or highest speed and pressing of said pedal will cause the presser 59 to operate the latch 27 opposite rod 22 in shifting device 18 and will lock said device to the rod 22, and said rod will then move and mesh the internal gear 14 inside of gear 12 with the gear 5 for direct driving.

Should it be desired to unmesh or neutralize any coöperating pair of gears that may be meshed, without necessarily selecting any other speed or meshing any other pair of gears, the lever 72 may be set to point at any one of the points marked "neutral" or "N" upon indicator frame 74. The arm 58 is thereby set to dispose its presser 59 between the two latches 27 that are located opposite the rod 21 or between the two latches opposite the rod 22, so that said presser clears fully all of the latches and is rendered inoperative whereby upon subsequently pressing of the pedal 49 any gear that may be in mesh is unmeshed and restored to locked neutral position.

When the gears are neutralized without incidentally meshing another pair of gears, it is desirable to prevent undue shock which the spring 42 might impart to the mechanism due to the rods 21, 22 moving idly and under tension of said spring after having just neutralized the gear. Such undue shock is prevented by the buffer-spring 44, which surrounds the end of rod 21 and is located between its head 45 and the block 43. As the rod 21 is actuated by the spring 42 the spring 44 becomes simultaneously compressed and thereby absorbs the undue force thereof, and eliminates undue shock to the mechanism in case neutralizing is performed without coincidently meshing the gears. During normal conditions of neutralizing operations such shock is fully avoided by the previous selection and the immediately subsequent meshing action of another pair of gears.

According to the modification of the invention shown in Fig. 11, the rod 21 is actuated by means of swinging a slotted pedal-arm 46 and therewith drawing toward the right a bar 85 which is slidably mounted in a guiding lug 86 forming part of the extremity of said rod. Said bar carries a block 87 which when drawn bears against and compresses an intervening buffer-spring 88 that in turn abuts against the lug 86. Upon pressing of the foot-pedal the drive-shaft is unclutched and during the unclutching operation the block 87 first moves idly, and then the rods 21, 22 are actuated thereby to perform the forward portion of their strokes and to neutralize any gear that may have been in mesh. A pawl 89 pivoted at 90 and pressed upon by a spring 91 bears against the edge 92 of block 87. At the termination of the forward movement of the rods 21, 22 the engaging head 93 of pawl 89 drops into the path of a stopping projection 94 which is secured to the rod 21, whereupon the pawl and said projection become engaged and lock the rods 21, 22 in shifted position with the spring 42 in compressed state, and the previously selected gear is locked to one of said rods. Upon the immediate releasing of the pedal 49, and during the first part of the clutching operation, the block 87 moves backwardly toward the right and away from the lug 86, and first releases the buffer-spring 88, without effecting the rod 21. During the interval of this initial part of the movement of block 87, a beveled cam-portion 95 thereof, engages a cam-portion 96 of pawl 89 and forces the pawl-head 93 out of the path of the projection 94, whereupon the pawl and said projection become disengaged, the rods 21, 22 with the compressed spring 42 released, and the previously selected gear is meshed.

It will be evident that with this mechanism any predetermined selection of speed desired may be made at any time before or after the swinging of the pedal 49 to perform the clutching operation of the drive-shaft, and such speed selection may be also made at any time and stage during the clutching operation.

Variations may be resorted to within the scope of the invention, and portions of the improvements may be used without others.

Having thus described my invention, I claim:—

1. In an automobile, the combination with a drive gear, and a transmission gear, of a rod connected to one of said gears, means to move said rod, means to actuate said rod, a stop upon said rod, a cam slidable along said rod engaged by said actuating means for actuating the rod, a detent to engage said stop for arresting the rod when in actuated state, and said cam actuating said detent to release said stop and permit said moving means to move the rod without control of said actuating means.

2. In an automobile, the combination with a drive gear, and a transmission gear, of a rod connected to one of said gears, means to move said rod, means to actuate said rod, a stop upon said rod, a cam slidable along said rod engaged by said actuating means for actuating the rod, a detent to engage said stop for arresting the rod when in actuated state, said cam actuating said detent to release said stop and permit said moving means to move the rod without control of said actuating means, and means to control the movement of said rod contrary to the power exerted by its moving means through actuation of said cam.

3. In an automobile, the combination with a drive gear, and a transmission gear, of a rod connected to one of said gears, a spring to move said rod, means to actuate said rod, a stop upon said rod, a cam slidable along said rod engaged by said actuating means for actuating the rod, a detent to engage said stop for arresting the rod when in actuated state, and said cam actuating said detent to release said stop and permit said spring to move the rod independent of control of said actuating means.

4. In an automobile, the combination with a drive gear, and a transmission gear, of a rod connected to one of said gears, a spring to move said rod, means to actuate said rod, a stop upon said rod, a cam slidable along said rod engaged by said actuating means for actuating the rod, a detent to engage said stop for arresting the rod when in actuated state, said cam actuating said detent to release said stop and permit said spring to move the rod independent of control of said actuating means, and means to control the movement of said rod contrary to the power exerted by said spring through actuation of said cam.

5. In an automobile, the combination with a drive gear, and a transmission gear, of a rod connected to one of said gears, means to move said rod, means to actuate said rod, a stop upon said rod, a cam slidable along said rod engaged by said actuating means for actuating the rod, a detent to engage said stop for arresting the rod when in actuated state, said cam actuating said detent to release said stop and permit said moving means to move the rod without control of said actuating means, and a buffer to absorb undue shock imparted to said rod by said moving means.

6. In an automobile, the combination with a drive gear, and a transmission gear, of a rod connected to one of said gears, a spring to move said rod, means to actuate said rod, a stop upon said rod, a cam slidable along said rod engaged by said actuating means for actuating the rod, a detent to engage said stop for arresting the rod when in actuated state, said cam actuating said detent to release said stop and permit said spring to move the rod independent of control of said actuating means, and a buffer to absorb undue shock imparted to said rod by said spring.

7. In an automobile, the combination with drive gears, and transmission gears, of a movable member, means to lock any one of said gears to said member, means to move said member, means to actuate said member, a cam slidable upon said member engaged by said actuating means for actuating the member, a detent to arrest said member when in actuated state, and said cam actuating said detent to release said member and permit said moving means to move the member without control of said actuating means.

8. In an automobile, the combination with drive gears, and transmission gears, of a movable member, means to lock any one of said gears to said member, a spring to move said member, means to actuate said member, a cam slidable upon said member engaged by said actuating means for actuating the member and spring, a detent to arrest said member when in actuated state, said cam actuating said detent to release said member to permit said spring to move the member without control of said actuating means, and means to control the movement of said member contrary to the power exerted by said spring through actuation of said cam.

9. In an automobile, the combination with drive gears, and transmission gears, of a movable member, means to lock any one of said gears to said member, means to actuate said member, a cam slidable upon said member engaged by said actuating means for actuating the member, a detent to arrest said member when in actuated state, said cam actuating said detent to release said member and permit said moving means to move the member without control of said actuating means, and a buffer to absorb undue shock imparted to said member by its moving means.

10. In an automobile, the combination with drive gears, and transmission gears, of a movable member, means to lock any one of said gears to said member, means to move said member, means to actuate said member, a cam slidable upon said member engaged by said actuating means for actuating the member, a detent to arrest said member when in actuated state, said cam actuating said detent to release said member and permit said moving means to move the member without control of said actuating means, a pivoted link joined to said member, a member joined to said link and actuated by said former member in directions opposite to the movement thereof, and means to lock any one of said gears to said latter member.

11. In an automobile, the combination with drive gears, and transmission gears, of a movable member, means to lock any one of said gears to said member, a spring to move said member, means to actuate said member, a cam slidable upon said member engaged by said actuating means for actuating the member and spring, a detent to arrest said member when in actuated state, said cam actuating said detent to release said member to permit said spring to move the member without control of said actuating means, a pivoted link joined to said member, a member joined to said link and actuated by said former member in directions opposite to the movement thereof, and means to lock any one of said gears to said latter member.

12. In an automobile, the combination with drive gears, and transmission gears, of a movable member, means to lock any one of said gears to said member, a spring to move said member, means to actuate said member, a cam slidable upon said member engaged by said actuating means for actuating the member and spring, a detent to arrest said member when in actuated state, said cam actuating said detent to release said member to permit said spring to move the member without control of said actuating means, a pivoted link joined to said member, a member joined to said link and actuated by said former member in directions opposite to the movement thereof, means to lock any one of said gears to said latter member, and a buffer to absorb undue shock imparted to said members by said spring.

13. In an automobile, the combination with drive gears, and transmission gears, of a movable member, means to lock any one of said gears to said member, means to move said member, means to actuate said member, means to arrest said member in actuated state, means to release said member to permit said moving means to move said member without control of said actuating means, a pivoted link joined to said member, a member joined to said link and actuated by said former member in directions opposite to the movement thereof, and means to lock any one of said gears to said latter member.

14. In an automobile, the combination with drive gears, and transmission gears, of a movable member, means to lock any one of said gears to said member, a spring to move said member, means to actuate said member, means to arrest said member in actuated state, means to release said member to permit said spring to move said member without control of said actuating means, a pivoted link joined to said member, a member joined to said link and actuated by said former member in directions opposite to the movement thereof, and means to lock any one of said gears to said latter member.

15. In an automobile, the combination with drive gears, and transmission gears, of a movable member, means to lock any one of said gears to said member, means to move said member, a pivoted link joined to said member, a member joined to said link and actuated by said former member in directions opposite to the movement thereof, and means to lock any one of said gears to said latter member.

16. In an automobile, the combination with drive gears, and transmission gears, of a movable member, means to lock any one of said gears to said member, a spring to move said member, a pivoted link joined to said member, a member joined to said link and actuated by said former member in directions opposite to the movement thereof, and means to lock any one of said gears to said latter member.

17. In an automobile, the combination with drive gears, and transmission gears, of a movable member, means to lock any one of said gears to said member, means to move said member, a pivoted link joined to said member, a member joined to said link and actuated by said former member in directions opposite to the movement thereof, and means to lock any one of said gears to said latter member.

18. In an automobile, the combination with a drive gear, and a transmission gear, of a spring for moving one of said gears, means to actuate said spring, means to lock said spring in actuated state, means to release said spring to permit it to move said gear without control, and means to absorb undue shock imparted to said gear by said spring.

19. In an automobile, the combination with drive gears, and transmission gears, of a movable member, means to lock any one of said gears to said member, means to move said member without control, and means to absorb undue shock imparted to said member by said moving means.

20. In an automobile, the combination with drive gears, and transmission gears, of a movable member, means to lock any one of said gears to said member, a spring to move said member, means to actuate said member, means to lock said member in actuated state, means to release said member to permit said spring to move it without control of said actuating means, and means to absorb undue shock imparted to said member by said spring.

21. In an automobile, the combination with drive gears, and transmission gears, of a movable member, means to lock any one of said gears to said member, a spring to move said member, means to actuate said member, means to lock said member in actuated state, means to release said member to permit said spring to move it without control of said actuating means, means to absorb undue shock imparted to said member by said spring, a pivoted link joined to said member, a member joined to said link and actuated by said former member in directions opposite to the movement thereof, and means to lock any one of said gears to said latter member.

22. In an automobile, the combination with a drive-shaft, a clutch therefor, operating means for said clutch, a drive gear, and a transmission gear, of a rod connected to one of said gears, means to move said rod, a stop upon said rod, a cam slidable along said rod engaged by said clutch operating means for actuating the rod, a detent to engage said stop and arrest the rod when in actuated state, and said cam actuating said detent to release said stop and permit said moving means to move the rod without control of said clutch operating means.

23. In an automobile, the combination with a drive-shaft, a clutch therefor, a pedal for operating said clutch, a drive gear, and a transmission gear, of a rod connected to one of said gears, a spring to move said rod, a cam slidable along said rod engaged by said pedal for actuating the rod, a detent to engage said rod when in actuated state, and said cam actuating said detent to release said rod and permit said spring to move the rod without control of said pedal.

24. In an automobile, the combination with a drive-shaft, a clutch therefor, operating means for said clutch, drive gears, and transmission gears, of a movable member, means to lock any one of said gears to said member, a spring to move said member, a cam slidable upon said member engaged by said clutch operating means for actuating the member, a detent to arrest said member when in actuated state, and said cam actuating said detent to release said member and permit said spring to move said member without control of said clutch operating means.

25. In an automobile the combination with a drive-shaft, a clutch therefor, operating means for said clutch, drive gears, and transmission gears, of a movable member, means to lock any one of said gears to said member, a spring to move said member, a cam slidable upon said member engaged by said clutch operating means for actuating the member, a detent to arrest said member when in actuated state, said cam actuating said detent to release said member and permit said spring to move said member without control of said clutch operating means, a pivoted link joined to said member, a member joined to said link and actuated by said former member in directions opposite to the movement thereof, and means to lock any one of said gears to said latter member.

26. In an automobile, the combination with a drive-shaft, a clutch therefor, operating means for said clutch, drive gears, and transmission gears, of a movable member, means to lock any one of said gears to said member, a spring to move said member, a cam slidable upon said member engaged by said clutch operating means for actuating the member, a detent to arrest said member when in actuated state, said cam actuating said detent to release said member and permit said spring to move said member without control of said clutch operating means, and means to absorb undue shock imparted to said member by said spring.

27. In an automobile, the combination with drive gears, and transmission gears, of shifting mechanism, means for each coöperating pair of said gears to connect one of its gears to said mechanism, and a yieldable device adapted to press resiliently against any one of said means to operate it.

28. In an automobile, the combination with drive gears, and transmission gears, of shifting devices for said gears, shifting mechanism, means for each of said devices to lock it to said mechanism, a yieldable actuator adapted to press resiliently against any one of said locking means to operate it, and means to operate said actuator.

29. In an automobile, the combination with drive gears, and transmission gears, of shifting devices for said gears, shifting mechanism, means for each of said devices to lock it to said mechanism, a rotatable actuator adapted to be disposed in operative relation to any one of said locking means, and means to rotate said actuator.

30. In an automobile, the combination with drive gears, and transmission gears, of shifting devices for said gears, shifting mechanism, means for each of said devices to lock it to said mechanism, a rotatable actuator adapted to press resiliently against any one of said means to operate it, and means to rotate said actuator to dispose it in operative relation to any one of said means.

31. In an automobile, the combination with drive gears, and transmission gears, of shifting mechanism, means for each coöperating pair of said gears to connect one of its gears to said mechanism, and an actuator adapted to press against any one of said means to operate it.

32. In an automobile, the combination with drive gears, and transmission gears, of shifting devices for said gears, a movable member, means to move said member, means for each of said devices to lock it to said member, a yieldable actuator adapted to press resiliently against any one of said locking means to operate it, and means to operate said actuator.

33. In an automobile, the combination with drive gears, and transmission gears, of shifting devices for said gears, a movable member, means to move said member, means for each of said devices to lock it to said member, a rotatable actuator adapted to be disposed in operative relation to any one of said locking means, and means to rotate said actuator.

34. In an automobile, the combination with drive gears, and transmission gears, of shifting devices for said gears, movable members, means to move said members in opposite directions, means for each of said devices to lock it to any one of said members, and a yieldable device adapted to press resiliently against any one of said means to operate it.

35. In an automobile, the combination with drive gears, and transmission gears, of shifting devices for said gears, movable members, means to move said members in opposite directions, means for each of said devices to lock it to any one of said members, a rotatable actuator adapted to press resiliently against any one of said locking means to operate it, and means to rotate said actuator to dispose it in operative relation to any one of said locking means.

36. In an automobile, the combination with drive gears, and transmission gears, of shifting devices for said gears, shifting mechanism, a latch for each of said devices to lock it to said mechanism, a rotatable arm, a spring-pressed resilient presser carried by said arm, and means to rotate said arm to dispose its presser in operative relation to any one of said latches and to press against said latch for locking its shifting device to said mechanism.

37. In an automobile, the combination with drive gears, and transmission gears, of shifting devices for said gears, a movable member, means to move said member, a latch for each of said devices to lock it to said member, a rotatable arm, a spring-pressed resilient presser carried by said arm, and means to rotate said arm to dispose its presser in operative relation to any one of said latches and to press against said latch for locking its shifting device to said member.

38. In an automobile, the combination with drive gears, and transmission gears, of shifting devices for said gears, movable members, means to move said members in opposite directions, a latch for each of said devices to lock it to said members, a rotatable arm, a spring-pressed resilient presser carried by said arm, and means to rotate said arm to dispose its presser in operative relation to any one of said latches and to press against said latch for locking its shifting device to said members.

39. In an automobile, the combination with drive gears, and transmission gears, of shifting devices for said gears, a rod movable longitudinally in a direction parallel to the axes of said gears, means to move said rod, means for each of said devices to lock it to said rod at points therealong, a yieldable actuator adapted to press resiliently against any one of said locking means to operate it, and means to operate said actuator.

40. In an automobile, the combination with drive gears, and transmission gears, of shifting devices for said gears, a rod movable longitudinally in a direction parallel to the axes of said gears, means to move said rod, a latch for each of said devices to lock it to said rod, a rotatable arm, a spring-pressed resilient presser carried by said arm, and means to rotate said arm to dispose its presser in operative relation to any one of said latches and to press against said latch for locking its shifting device to said rod.

41. In an automobile, the combination with drive gears, and transmission gears, of shifting devices for said gears, rods movable longitudinally in directions parallel to the axes of said gears, means to move said rods in opposite directions, a pair of latches for each of said devices to lock it to one or the other of said rods at points therealong a rotatable arm, a spring-pressed resilient presser carried by said arm, and means to rotate said arm to dispose its presser in operative relation to any one of said latches and to press against said latch for locking its shifting device to said rods.

42. In an automobile, the combination with drive gears, and transmission gears, of shifting devices for said gears, shifting mechanism, a spring operated latch for each of said devices to lock it to said mechanism, and a yieldable actuator for depressing any one of said latches.

43. In an automobile, the combination with drive gears, and transmission gears, of shifting devices for said gears, rods movable longitudinally in directions parallel to the axes of said gears, means to move said rods in opposite directions, means for each of said devices to lock it to any one of said rods, a yieldable actuator adapted to press resiliently against any one of said locking means, an indicator, indicating means adapted to be moved relatively to said indicator, and means to transmit the movement of said indicating means to said member.

44. In an automobile, the combination with drive gears, and transmission gears, of shifting devices for said gears, rods movable longitudinally in directions parallel to the axes of said gears, means to move said rods in opposite directions, means for each of said devices to lock it to any one of said rods, a rotatable actuator adapted to be disposed in operative relation to any one of said locking means, a lever, a rod rocked thereby, and means to transmit the rotation of said rod to said actuator.

Signed at the city of New York, in the county of New York and State of New York, this 10th day of March, A. D. 1916.

MERION J. HUGGINS.

Witnesses:
CHAS. W. LA RUE,
B. ROMAN.